April 19, 1949. H. A. SCHLATTER 2,467,536
PORTABLE WELDING DEVICE
Filed Oct. 3, 1946
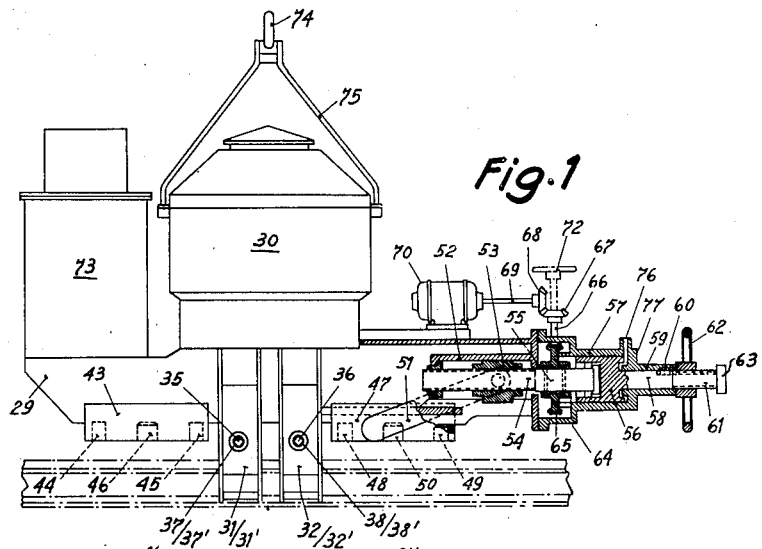
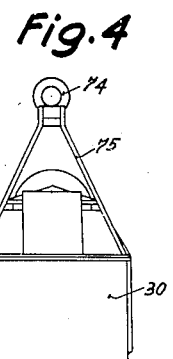
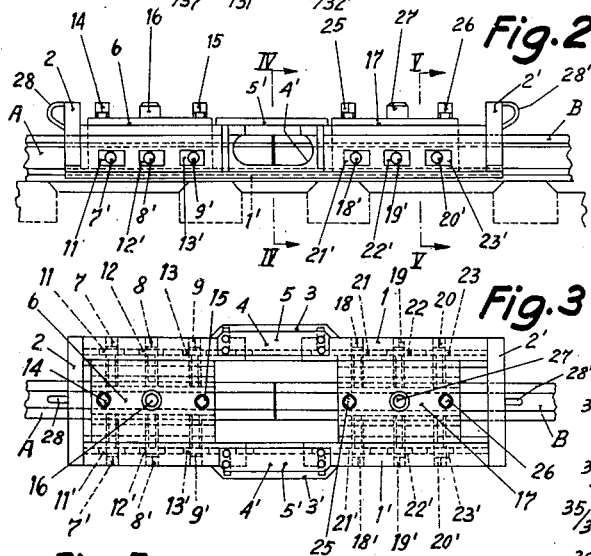
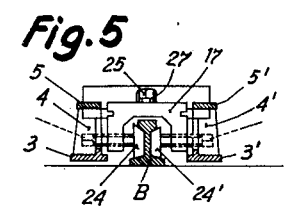
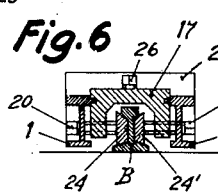
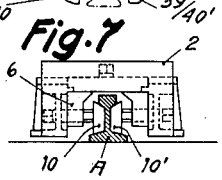
INVENTOR.
HANS ALFRED SCHLATTER
ATTORNEY Patented Apr. 19, 1949

2,467,536

UNITED STATES PATENT OFFICE 2,467,536

PORTABLE WELDING DEVICE

Hans Alfred Schlatter, Zurich, Switzerland

Application October 3, 1946, Serial No. 701,007
In Switzerland September 12, 1945

Section 1, Public Law 690, August 8, 1946
Patent expires September 12, 1965

13 Claims. (Cl. 219—4)

The present invention relates to portable devices for electric autogenous butt welding of the fusing-heat type, particularly to devices designed to be used for heavy pieces of metal, such as railroad tracks.

According to a new preferred embodiment of the invention the welding device comprises a clamping or gripping arrangement including a bridge bridging the spot to be welded and formed by two longitudinal bearer members interconnected at their ends by yoke pieces. The bridge contains two clamp or gripping chambers wherein the ends of blanks or rails to be welded together are locked, one of the said two chambers being stationary and the other one shiftable. The device further comprises a suspended welding unit completely separated and distinct from said clamping means and including a chassis supporting the welding transformer. Arranged at the lower side of the said chassis are a fixed abutment for the stationary clamp chamber and a shiftable engaging device with drive means for the shiftable clamp chamber of the locking device. The secondary of the welding transformer is connected with two contact jaws supported on the chassis and electrically insulated therefrom. These jaws are so designed that they engage from the top into the middle part of the clamping or locking device in such a way that they are able respectively to grip the ends of one of the blanks or rails (to be joined by welding) by means of contact pieces provided at the ends of their shanks.

The equipment here disclosed is particularly adapted to weld track rails in situ, that is, at any place along the track, both in connection with the laying of new tracks as well as in doing repair or maintenance work.

The welding equipment of the invention is transported preferably upon a railway truck adapted to run on the tracks and equipped with a jib crane. Inasmuch as in welding of rails along the railroad tracks, the work of adjusting or aligning the rails in the locking or clamping device, and the removal of the latter from the track joint, once the latter has been welded, requires usually considerably more time than the welding work itself, it is preferable to provide two or more such clamping devices. This can be readily accomplished as the welding unit proper is separate from the clamping device, in fact, it is functionally combined therewith only for doing actual welding work.

An exemplified embodiment of the object of the invention is illustrated, partly in diagrammatic form, on the accompanying drawings:

Fig. 1 is a lateral elevation of the welding unit forming part of the portable equipment according to the invention for electric (autogenous) fusing-heat butt welding of rails or railroad tracks.

Fig. 2 is a side view of the clamping or locking device for the track rails to be joined together by welding and forming a part of equipment.

Fig. 3 is a top view of Fig. 2.

Fig. 4 is an end view of the welding unit of the equipment.

Fig. 5 is a section taken on line IV—IV of Fig. 2.

Fig. 6 is a section taken on line V—V of Fig. 2, and

Fig. 7 is an end view of the clamping device, as shown in Fig. 2.

The clamping device includes a bridge part which bridges two rails to be welded together. The bridge comprises two longitudinal bearers 1 and 1', the ends of which 2 and 2' are positioned across the rails. In their median portions, longitudinal bearer 1 and 1' have cranked portions 3 and 3', the upper flanges and webs thereof presenting cutouts at these points, so that peep holes 4 and 4' are formed, for inspection. The gaps in the upper flanges of the longitudinal bearers 1 and 1' are bridged by outwardly staggered pieces of flat iron 5 and 5'. Inserted in this bridge is a clamp chamber 6 having a U-shaped profile. This chamber is mounted so as to be axially shiftable on the top flanges of the longitudinal bearers 1 and 1' in the portion of the bridge near yoke 2. The bearers engage slots in the side walls of the chamber. In both side walls of the clamp chamber, there are three screw-threaded holes in which are screwed clamp bolts 7, 8, 9, and 7', 8', 9', respectively, which act upon fish plates 10, 10' fitting into the plate space of one of the two rails A to be welded together. For clamp bolts 7, 8, 9, and 7', 8', 9', there are provided in the webs of the longitudinal bearer members 1 and 1', respectively, longitudinal slots or apertures 11, 12, 13, and 11', 12', 13'. Screwed into the covering surface of the clamp chamber 6 are two clamp or set bolts 14 and 15 which act on the head of the rail A. A fixed anchor bolt 16 is provided between clamp screws or bolts 14 and 15 on top of clamp space 6. On the upper flanges of the longitudinal bearers 1 and 1', in the portion of the bridge near yoke 2', a second clamp chamber 17 is supported so as to be axially shiftable. This second clamp chamber is of exactly the same construction as chamber 6. Into each of its side walls, three clamp bolts 18, 19, 20, and 18', 19', 20', are screwed which engage oblong openings 21, 22, 23, and 21', 22', 23', respectively, formed in the webs of the longitudinal bearers 1 and 1'. The bolts act upon two fish plates 24, 24' which exactly fit into the plate space of the second one of the two rails to be welded together, that is, rail B. Screwed into the top surface of clamp chamber 17 are two pressure or clamp bolts 25 and 26 acting from above upon the head of rail B. Between the clamp bolts 25 and 26, on top of the cover surface of clamp chamber 17 a fixed anchor pin 27 is provided. Yokes 2 and 2' have eyelets 28, 28'.

Completely separated from the clamping or locker unit, as just described is a welding transformer 30, the latter being fixedly mounted upon a rigid chassis 29. Connected with the secondary of welding transformer 30 are two contact pincers or jaws 31, 31', and 32, 32' respectively conveniently spaced apart from each other. The legs or shanks thereof are supported upon chassis 29 by fixed axles 33, 33', and 34, 34', respectively electrically insulated from each other. The shanks of jaws 31, 31', and 32, 32' grip chassis 29. Below chassis 29, a screw-threaded spindle 35 and 36 respectively is passed through each pair of shanks, the said spindles having right- and left-hand screw-threads. In each shank 31, 31', and 32, 32' there is supported and seated upon the right-hand and left-hand screw-thread of the spindle 35 and 36, respectively, a nut 37, 37', and 38, 38' respectively. These nuts can swivel but not rotate and are also not axially displaceable so that by revolving screw-threaded spindles 35 and 36, respectively, the contact jaws may be opened and closed at will. At the lower end of each shank of the contact jaws 31, 31', and 32, 32', contact elements 39, 39', and 40, 40' respectively are mounted to rock on axles 41, 41', and 42, 42'. Contact elements 39, 39', and 40, 40' are so constructed that they will fit into the fish-plate spaces of rails A and B which are to be welded together. Fixedly arranged on the bottom end of the chassis 26 and outside the contact jaws 31, 31', an abutment 43 for the clamp chamber 6 is provided. The said abutment 43 has in its lower side two bore holes 44 and 45 into which the upwardly extending ends of the clamp bolts 14 and 15 are able to engage freely, and a hole 46 for journal pin 16 of the clamp chamber 6. Outside the contact jaw 32, 32', in the bottom part of the chassis 29, there is a longitudinally shiftable dog 47 for the clamp chamber 17. Dog 47 has in its under side two openings 48 and 49 into which the upwardly extending ends of the clamp bolts 25 and 26 can freely engage, and a bearing recess 50 for journal 27. Bilaterally acting upon dog 47 is a connecting rod 51, pivoted at its opposite end to crosshead 53 sliding in a guide or keyway 52 in chassis 29. The said crosshead 53 has female screw-threads and is threaded on a correspondingly threaded portion 54 of a spindle 55. A piston 56 is mounted on the spindle coaxially therewith so that the piston can rotate but is axially fixed on the spindle. The piston slides inside a cylinder 57. Fixedly attached to piston 56 is a guide rod 58 which is held in a guide groove 59, while being locked against rotation by a wedge 60. The end of guide rod 58 projects from guide groove 59 and has a screw-thread 61. Seated upon the said screw-thread 61 is a hand-wheel 62. If the wheel is turned so that it will engage with, or abut against, the end of guide groove 59, then guide rod 58 with piston 56 is moved into one of its limit positions (to the right-hand side in the case here illustrated) and may be locked therein. If, conversely, hand wheel 62 is moved away from the guide 59 toward a stop 63 provided at the end of the screw-thread 61, then the guide rod 58 with piston 56 can shift axially within two limit positions. Seated upon spindle 55, inside an extension casing 64 of cylinder 57, is a worm gear 65 which is capable of axial movement but secured against rotation by a wedge. In meshed relation with worm gear 65 is a worm seated upon a shaft 66 supporting at its end a bevel gear 67 which is in engagement with another bevel gear 68 seated upon the shaft 69 of a reversible electric motor 70. Shaft 66 is extended beyond bevel gear 67 which extension supports a hand wheel 72.

Mounted further upon chassis 29 is a cooling or refrigerating unit 73 by means of which the welding transformer 30 and optionally also the contact jaws 39, 39', and 40, 40' can be cooled. Secured on the casing or shell of the welding transformer 30 is a handle 75 having a bight or eyelet 74 at its top for the purpose of freely suspending the welding transformer 30 with chassis 29 conjointly with all parts mounted thereon from a hoist or the jib of a crane.

For the welding of rails A and B, the ends thereof are first clamped and locked in the clamping device. The bridge consisting of longitudinal bearers 1 and 1' and yokes 2 and 2' is first separately placed over the rail joints so that the ends of the rails A and B are positioned in the middle of the bridge and can be inspected through check-holes 4 and 4'. Next, clamp chamber 6 is fitted from above into the cranked portion of the bridge which must have at least the same length as the clamp chamber 6 or 17, respectively, then the chamber is mounted on its guides and shifted to a point adjacent to yoke 2. Now, fish-plates 10 and 10' are fitted in and caused to assume their proper positions relative to rail A, whereupon the clamp or locking bolts 7, 8, 9 and 7', 8', 9' are introduced through the openings 11, 12, 13, and 11', 12', 13' and screwed home in their threads in the side walls of the clamp spaces 6. It is by these clamp bolts 7, 8, 9, and 7', 8', 9' that the fish-plates 10 and 10' are press-fitted into the corresponding spaces of the rail A. In a similar way, clamp chamber 17 is thereupon fitted into the bridge and placed on longitudinal bearers 1 and 1' guiding the chamber. Then, by means of clamp bolts 18, 19, 20, and 18', 19', 20' the fish-plates are pressed into the plate spaces of the end of rail B. By lock bolts 7, 8, 9, 7', 8', 9', 18, 19, 20, 18', 19' and 20' as well as clamp bolts 14, 15 and 25, 26, the ends of the two rails, both in a lateral sense as well as in height can be aligned and adjusted exactly in the required manner. Once this has been accomplished, the work of welding the ends of the rails A and B can proceed.

For this purpose, the welding transformer 30, suspended from the hook of a hoist or jib crane, is brought with chassis 29 to a point above the clamping device and then lowered thereon. Abutment 43 is thus placed upon clamp chamber 6, while the ends of clamp bolts 14 and 15 engage in bores or apertures 44 and 45, pin or journal 16 being accommodated in bearing 46. Dog 47 is at the same time placed upon the clamp chamber 17.

The contact jaws 31, 31' and 32, 32' are so fashioned that, when in opened position, they are able to reach through flat irons 5 and 5' into the cranked portion of the bridge. The contact jaws are closed by spindles 35 and 36 in such a way that the contact elements 39 and 39' of contact jaws 31, 31' are pressed from both sides into the plate spaces of the rail A and the contact elements 40, and 40' of contact jaws 32, 32' from both sides into the plate spaces of rail B. The welding work can now begin. The first stage consists of pre-heating followed by the fusion and the jumping or upsetting. For pre-heating, guide rod 58 is locked with piston 56 and thus also with spindle 55 in one end position. When the welding current which is supplied from the secondary of the welding transformer 30 begins to flow, the reversible motor 70 will rotate spindle 55 through bevel gears 68 and 67, shaft 66, the worm, and worm gear 65. According to the particular direction of rotation of the reversible electric motor 70, the crosshead or slide 53 seated upon threaded portion 54 of spindle 55 will be moved forwards or backwards. This reciprocating movement is transmitted by connecting rod 51 to dog 47 and from the latter to the movable clamp chamber 17 in which rail B is held in a locked position. As a result of the to-and-fro movements of the locked rail B, the circuit between the ends of the rails A and B is alternately closed and opened, and in this manner pre-warming is accomplished. Once this stage is completed, hand-wheel 62 is rotated back to the stop 63. By means of the reversible motor 70, the crosshead 53 and conjointly therewith dog 47 and the clamp chamber 17 with the clamp-locked rail B are moved forwards. At this stage, however, the movement has to be slower than during the pre-heating stage. In order to obtain such reduction in speed, the electric motor 70 may either be used with field reversal or else a reversible change-speed gear is inserted between the electric motor 70 and shaft 66. During this movement of the rail B such uneven and rusty spots, as may be upon the surfaces of the two rails A and B to be united by welding, will be removed by melting, whereupon these areas are raised to welding temperature. After attaining a certain fusion path, a valve 76 is opened by means of a stop (not shown) adjustably supported on dog 47, whereby oil under pressure is admitted to cylinder space 77. As a result, piston 56 and conjointly therewith the spindle 55 will be rapidly moved with great force towards the left (in the instance here shown), which movement will be imparted to the clamp chamber 17 in which rail B is locked by way of the crosshead 55, the connecting rod 51 and driver 47. As a result, the ends of the two rails A and B will be upset, that is, pressed together. The welding current is then cut off by a further stop (not shown) adjustably attached after a definite adjustable upsetting stroke or path is completed, thereby completing the act of welding.

The reciprocating movement of the crosshead may, if desired, be manually accomplished by means of hand-wheel 72.

What is claimed is:

1. In an electric welding device of the character described, in combination a clamping means including a bridge for bridging the spot to be welded and constituted by two longitudinal bearer members and two yoke pieces interconnecting said bearer members at their ends, said bridge further including walls forming a stationary and a displaceable clamping chamber within which the ends of work pieces to be welded are locked, a welding unit including a chassis and a welding transformer supported by said chassis, means for supporting said welding unit, fixed abutment means for the stationary clamp chamber mounted at the lower side of said chassis, a displaceable engaging device including drive means operatively connected with the displaceable clamping chamber, two contact jaws supported on the chassis electrically insulated therefrom, said jaws connected in circuit with the secondary of the welding transformer and constructed so as to engage from the top into the middle part of the clamping means, and contact pieces provided at each end of the jaw shanks and constructed to grip one end of each of the work pieces.

2. An electric welding device as described in claim 1, wherein said two longitudinal bearer members have an outwardly cranked center portion corresponding to at least the length of one of said clamping chambers, and wherein the upper flanges of the longitudinal bearers are cut out at the cranked portion of the bearers and flat irons bridge said cut out portions, said flat irons being disposed to extend outwardly.

3. An electric welding device as described in claim 1, wherein the side walls of said clamping chambers comprise grooves capable of receiving the upper flanges of the longitudinal bearers constituting guides for said clamping chambers.

4. An electric welding device as described in claim 1, wherein two press members are disposed within each clamping chamber, and pressure screws are supported in the side walls of the clamping chambers, said pressure screws being arranged to engage said press members for moving the same toward a work piece to be welded, and wherein the webs of said longitudinal bearers include elongated openings through which said screws are passed.

5. An electric welding device as described in claim 1 wherein pressure screws are passed through the top walls of the clamp chambers, the ends of said pressure screws being positioned to engage work pieces to be welded together.

6. An electric welding device as described in claim 1, wherein an anchor bolt is supported on the top wall of each clamp chamber, and wherein abutment means and the engaging device are provided on the chassis, said abutment means and engaging device each including a bearing for said anchor bolt.

7. An electric welding device as described in claim 1, wherein two connecting rods are operatively connected with said engaging device at one end, and a crosshead is connected to the other end of said connecting rods, said crosshead being operatively connected with said drive means.

8. An electric welding device as described in claim 1, in combination with two connecting rods operatively connected at one end with said engaging device, a crosshead having an internal thread operatively connected with the other ends of said connecting rods and with said drive means, a spindle engaging said crosshead thread, a worm gear supported on the spindle axially slidably and secured against rotation, a worm supported in engagement with the worm gear, a reversible electric motor for rotating the worm, a cylinder fixedly supported, and a piston slidable in said cylinder and operatively connected with the spindle, said spindle being mounted rotatably but fixed axially on said piston, and a supply of fluid under pressure for displacing said piston.

9. An electric welding device as described in claim 1, in combination with two connecting rods operatively connected at one end with said engaging device, a crosshead having an internal thread operatively connected with the other ends of said connecting rods and with said drive means, a spindle engaging said crosshead thread, a worm gear supported on the spindle axially slidably and secured against rotation, a worm supported in engagement with the worm gear, a reversible electric motor for rotating the worm, a cylinder fixedly supported, a piston slidable in said cylinder and operatively connected with the spindle, said spindle being mounted rotatably but fixed axially on said piston, a supply of fluid under pressure for displacing said piston, a third connecting rod connected with said piston, means for guiding said third connecting rod within the cylinder, a wedge for securing the connecting rod against rotation, said third connecting rod having an external thread extending above the guiding means in the cylinder, a handwheel mounted on said thread of the third connecting rod, whereby said connecting rods and piston can be moved into a limit position and secured in the same by operation of the handwheel.

10. An electric welding device as described in claim 1, wherein a spindle having a left and right thread connects the shanks of said contact jaws, said spindle being constructed to cause an opening and closing of the contact jaws in response to a rotation of the spindle.

11. An electric welding device described in claim 1, wherein said contact piece at the ends of the shanks of the contact jaws is pivotally supported.

12. An electric welding device as described in claim 1, wherein cooling means for dissipating the welding heat are supported on the chassis.

13. In an electric welding device of the character described, in combination a clamping means including a bridge for bridging the spot to be welded and constituted by two longitudinal bearer members and two yoke pieces interconnecting said bearer members at their ends, said bridge further including walls forming a stationary and a displaceable clamping chamber within which the ends of work pieces to be welded are locked, fixed abutment means for the stationary clamp chamber mounted at the lower side of said chassis, a displaceable engaging device including drive means operatively connected with the displaceable clamping chamber, two contact jaws supported on the chassis electrically insulated therefrom, said jaws constructed so as to engage from the top into the middle part of the clamping means, and contact pieces provided at each end of the jaw shanks and constructed to grip one end of each of the work pieces.

HANS ALFRED SCHLATTER.

REFERENCES CITED

The following references are of record in the file of this patent:

UNITED STATES PATENTS

| Number | Name | Date |
|---|---|---|
| 671,084 | Kleinschmidt et al. | Apr. 2, 1901 |
| 1,762,085 | Stedefeld | June 3, 1930 |
| 1,984,988 | Raupach et al. | Dec. 18, 1934 |
| 2,015,184 | Hopkins | Sept. 24, 1935 |
| 2,212,393 | Dalton | Aug. 20, 1940 |
| 2,404,620 | Cooper | July 23, 1946 |